(12) United States Patent
Stevens

(10) Patent No.: US 12,039,432 B2
(45) Date of Patent: Jul. 16, 2024

(54) ARTIFICIAL NEURAL NETWORK ACTIVATION FUNCTION

(71) Applicant: Infineon Technologies AG, Neubiberg (DE)

(72) Inventor: Andrew Stevens, Neufinsing (DE)

(73) Assignee: Infineon Technologies AG, Neubiberg (DE)

( * ) Notice: Subject to any disclaimer, the term of this patent is extended or adjusted under 35 U.S.C. 154(b) by 931 days.

(21) Appl. No.: 16/822,616

(22) Filed: Mar. 18, 2020

(65) Prior Publication Data

US 2021/0295134 A1 Sep. 23, 2021

(51) Int. Cl.
| | |
|---|---|
| *G06N 3/048* | (2023.01) |
| *G06F 5/01* | (2006.01) |
| *G06F 7/499* | (2006.01) |
| *G06N 3/063* | (2023.01) |

(52) U.S. Cl.
CPC .............. *G06N 3/048* (2023.01); *G06F 5/01* (2013.01); *G06F 7/49973* (2013.01); *G06N 3/063* (2013.01)

(58) Field of Classification Search
CPC ....... G06F 5/01; G06F 7/49973; G06N 3/048; G06N 3/0481; G06N 3/063
See application file for complete search history.

(56) References Cited

U.S. PATENT DOCUMENTS

| | | | | |
|---|---|---|---|---|
| 2011/0004579 | A1* | 1/2011 | Snider | G06N 3/049 |
| | | | | 706/26 |
| 2018/0373977 | A1* | 12/2018 | Carbon | G06N 3/063 |
| 2019/0138922 | A1* | 5/2019 | Liu | G06N 3/048 |
| 2019/0205736 | A1* | 7/2019 | Bleiweiss | G06N 3/045 |
| 2019/0303749 | A1* | 10/2019 | Appuswamy | G06F 7/53 |
| 2020/0151541 | A1* | 5/2020 | Meng | G06F 17/15 |
| 2020/0364545 | A1* | 11/2020 | Shattil | G06N 3/082 |
| 2021/0133568 | A1* | 5/2021 | Voelker | G06F 7/588 |
| 2021/0182077 | A1* | 6/2021 | Chen | G06V 10/70 |
| 2021/0224069 | A1* | 7/2021 | Chen | G06F 9/30079 |
| 2022/0245753 | A1* | 8/2022 | Ould-Ahmed-Vall | |
| | | | | G06N 3/044 |

OTHER PUBLICATIONS

Fausett, Laurene V. Fundamentals of neural networks: architectures, algorithms and applications. Pearson Education India, 2006. (Year: 2006).*

Mishra, Amit, and Krishna Raj. "Implementation of a digital neuron with nonlinear activation function using piecewise linear approximation technique." 2007 Internatonal Conference on Microelectronics. IEEE, 2007. (Year: 2007).*

(Continued)

*Primary Examiner* — Kamran Afshar
*Assistant Examiner* — Randall K. Baldwin
(74) *Attorney, Agent, or Firm* — Eschweiler & Potashnik

(57) ABSTRACT

An artificial neural network (ANN) apparatus can include processing component circuitry that receives linear inputs, and removes linearity from the one or more linear inputs based on an S-shaped saturating activation function that generates a continuous non-linear output. The neurons of the ANN comprise digital bit-wise components configured to transform the linear inputs into the continuous non-linear output.

20 Claims, 7 Drawing Sheets

(56) References Cited

OTHER PUBLICATIONS

Jeyanthi, S., and M. Subadra. "Implementation of single neuron using various activation functions with FPGA." 2014 IEEE International Conference on Advanced Communications, Control and Computing Technologies. IEEE, 2014: 1126-1131. (Year: 2014).*
Géron, Aurélien. Hands-on Machine Learning with Scikit-Learn, Keras, and TensorFlow: Unsupervised learning techniques. O'Reilly Media, Incorporated, 2019. (Year: 2019).*
Braendler, David, Tim Hendtlass, and Peter O'Donoghue. "Deterministic bit-stream digital neurons." IEEE transactions on neural networks 13.6 (2002): 1514-1525. (Year: 2002).*
Marra, S., M. A. Iachino, and F. C. Morabito. "Tanh-like activation function implementation for high-performance digital neural systems." 2006 Ph. D. Research in Microelectronics and Electronics. IEEE, 2006: 237-240. (Year: 2006).*
Marra, Salvatore, Maria Antonia Iachino, and Francesco Carlo Morabito. "High speed, programmable implementation of a tanh-like activation function and its derivative for digital neural networks." 2007 International Joint Conference on Neural Networks. IEEE, 2007. (Year: 2007).*
Patel, Nitish D., Sing Kiong Nguang, and George G. Coghill. "Neural network implementation using bit streams." IEEE Transactions on Neural Networks 18.5 (2007): 1488-1504. (Year: 2007).*
Abrol, Sahil, and Rita Mahajan. "Implementation of single artificial neuron using various activation functions and XOR gate on FPGA chip." 2015 Second International Conference on Advances in Computing and Communication Engineering. IEEE, 2015: 118-123 (Year: 2015).*
Li, Chunyuan, et al. "Learning weight uncertainty with stochastic gradient mcmc for shape classification." Proceedings of the IEEE Conference on Computer Vision and Pattern Recognition. 2016: 5666-5675 (Year: 2016).*
Courbariaux, Matthieu, et al. "Binarized neural networks: Training deep neural networks with weights and activations constrained to + 1 or-1." arXiv preprint arXiv:1602.02830 (2016). (Year: 2016).*
Hikawa, Hiroomi. "A digital hardware pulse-mode neuron with piecewise linear activation function." IEEE Transactions on Neural Networks 14.5 (2003): 1028-1037. (Year: 2003).*
Rani, SP Joy Vasantha, and P. Kanagasabapathy. "Multilayer perceptron neural network architecture using vhdl with combinational logic sigmoid function." 2007 International Conference on Signal Processing, Communications and Networking. IEEE, 2007:404-409 (Year: 2007).*
Pu, Yunchen, et al. "Variational autoencoder for deep learning of images, labels and captions." Advances in neural information processing systems 29 (2016): 1-9 (Year: 2016).*
Kim, Minje, and Paris Smaragdis. "Bitwise neural networks." arXiv preprint arXiv:1601.06071 (2016). (Year: 2016).*
Yin, Shihui, et al. "XNOR-SRAM: In-memory computing SRAM macro for binary/ternary deep neural networks." IEEE Journal of Solid-State Circuits 55.6 (Jan. 2020): 1733-1743. (Year: 2020).*
Pedamonti, Dabal; "Comparison of non-linear activation functions for deep neural networks on MNIST classification task"; University of Edinburgh, Department of Computer Science; Apr. 8, 2018.
Yang, Tao et al.; "Design Space Exploration of Neural Network Activation Function Circuits"; 2018 IEEE.
Panicker, Manish et al; "Efficient FPGA Implementation of Sigmoid and Bipolar Sigmoid Activation Functions for Multilayer Perceptrons" Amrita School of Engineering, Department of Electronics and Communications; IOSR Journal of Engineering; vol. 2, Issue 6, Jun. 2012.
Nwankpa, Chigozie Enyinna et al; "Activation Functions: Comparison of Trends Practice and Research for Deep Learning"; Nov. 8, 2018.
Soria-Olivias, Emilio et al.; "A Low-Complexity Fuzzy Activation Function for Artificial Neural Networks"; IEEE Transactions on Neural Networks, vol. 14, No. 6, Nov. 2003.

* cited by examiner

ARTIFICIAL NEURAL NETWORK ACTIVATION FUNCTION

FIELD

The present disclosure is in the field of neural networks, and more specifically, artificial neural network activation (ANN) functions for digital implementation.

BACKGROUND

Artificial neural networks (ANNs) can be computing systems inspired by biological neural networks of a brain. Such systems "learn" to perform tasks by considering examples, generally without being programmed with task-specific rules. For example, in image recognition, these systems might learn to identify images that contain cats by analyzing example images that have been manually labeled as "cat" or "no cat" and using the results to identify cats in other images. The systems can do this without any prior knowledge of cats, for example, that they have fur, tails, whiskers and cat-like faces. Instead, characteristics are automatically generated from the examples that being processed.

An ANN can be based on a collection of connected units or nodes called artificial neurons or neurons, which loosely model the neurons in a biological brain. Each connection, like the synapses in a biological brain, can transmit a signal to other neurons. An artificial neuron that receives a signal then processes it and can signal other neurons connected to it. The connectivity pattern between its neurons is inspired by the organization of the animal visual cortex. Individual cortical neurons respond to stimuli in a restricted region of space known as the receptive field. The receptive fields of different neurons can partially overlap such that they tile the visual field. The response of an individual neuron to stimuli within its receptive field can be approximated mathematically.

In the current artificial neural networks, the activation functions are used with approximations based on look-up tables, or alternative functions with similar characteristics (e.g., polynomial approximations). However, even these alternatives still utilize either look-up table memories and/or multiply/divide operations, which can make them sub-optimal for lower-power embedded applications.

DETAILED DESCRIPTION

Figure 1:
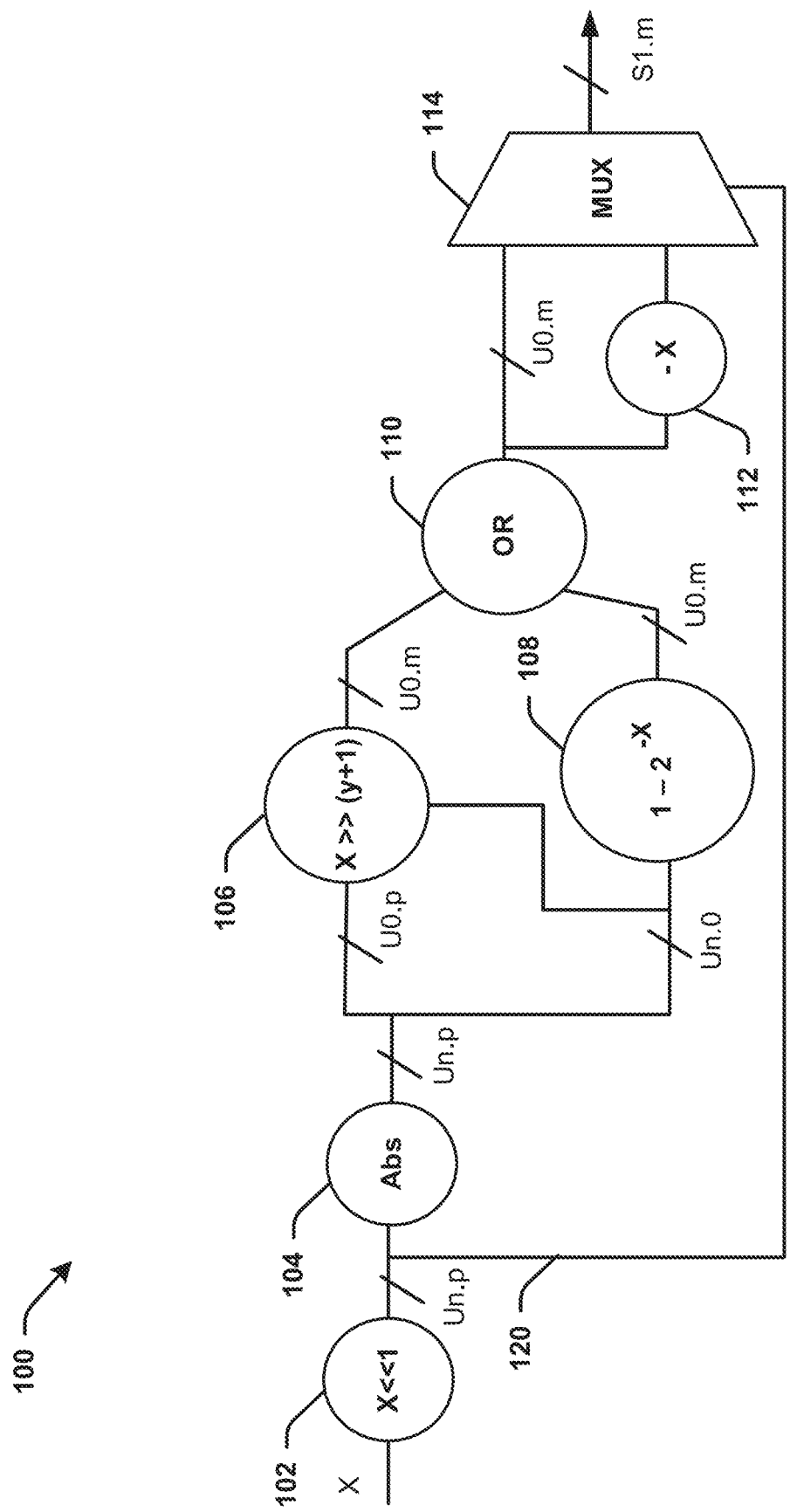
FIG. 1 is a block diagram illustrating a neuron component or configuration of a recursive artificial neural network (ANN) according to various aspects (embodiments) described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described, artificial neural network (e.g., gated recurrent units (GRU) and long short-term memory (LSTM) recursive networks) use (and require)

sigmoid ('S-shaped') saturating activation functions. The functions used (e.g., logistic sigmoid, tanh) are defined in terms of transcendental functions and require considerable resources for direct implementation. This can make them impractical for lowest-power resource-constrained implementations (e.g., integrated sense-and-control SoC for industrial or automotive applications). Even for less resource-constrained applications, implementation of these activation functions can be problematic if used in parallel computation with multiple processing units.

In one embodiment, as continuity of the activation function derivative is not necessary for correct operation of the target neural network types, a piece-wise linear saturating activation function, where the computation includes only bit-slicing operation(s), bit-shift operation(s), increment operation(s), decrement operation(s), an addition operation(s), or subtraction operation(s).

Various embodiments can include an extraction component that recursively obtains inputs based on extracted data of one or more objects (e.g., an image, a stop sign, a bike, etc.). Processing circuitry, coupled to the extraction component, can process the inputs, via one or more neuron components that provide a continuous non-linear output to perform a classification operation or a detection operation. The one or more neuron components can be configured to modify the plurality of inputs according to an activation function that comprises an S-shaped saturating activation function using only digital bit-wise operations to generate the continuous non-linear output.

For example, the neuron components of the processing circuitry can comprise a shifter and at least one bit-wise operator (e.g., a bit-slicer or operator, a bit-shifter, an incrementor, a decrementor, an adder, or subtractor). The shifter and the at least one bit-wise operator can be configured to digitally compute the activation function to provide the continuous non-linear output without discontinuities. Additional aspects and details of the disclosure are further described below with reference to figures.

FIG. 1 illustrates an example neuron component 100 of an ANN system that can reliably classify object data into certain categories/classes allowing driver assistance systems or other neural network systems to perform critical decisions. An output of a shift operator component 102 is coupled to an input of an absolute value component 104. An output designated as an unsigned (U) n integer bits and p fractional bits (Un.p)) of the absolute value component 104 is coupled to an input of a shift operator component 106 and an input of a decoder component 108. A bitwise operator 110 receives outputs from the shift operator component 106 and the decoder component 108, respectively. An output of the bitwise operator 110 is coupled to a negating component 112 and to an input of a multiplexer 114. The negating component 112 further provides a negated output/logical complement of the bitwise operator 110 to the multiplexer 114. Based on an output of the shift operator component 102 the multiplexer 114 selects an output as a signed (S) plus one number of fractional bits m (S1.$m$) to provide for further analysis to another neuron or ANN layer, where m is bit bit-vector where the most significant bit (MSB) and all other bits except the x-th left-most are zero and a configured one bit into a particular position. The output can be a non-linear output such as a continuous non-linear output.

Shift operator component 102 can be configured as a shifter that receives input X from raw data extracted from one or more data sets of an object or image, or a previous ANN layer. The input X, for example, can comprise a set of linear data, or other input of the ANN to be provided non-linear behavior via the neuron 100 and at the output (e.g., as S1.$m$, or the like) of the neuron 100 according to the activation function configured as the neuron 100. The first shift operator component 102 includes a double angle brackets denoting that it is configured to perform an arithmetic shift operation. For example, a shifting can be performed as a binary shift left, or other binary shift operations such as a value that is less than one, or as one otherwise. The shifting operation can be performed according to a constant (e.g., 1 or any other constant) as configured by one or more different conducting lines, an arithmetic operator, or other component, for example.

The absolute value (Abs) component 104 can receive the output of the shift operator component 102. The Abs component 104 can be configured to perform a conditional inversion, for example, as an inverter for a conditional inversion operation, or other arithmetic operation. The Abs component 104 can check the sign of the output of the shift operator component 102, and if negative, for example, then invert it. The Abs component 104 can be a firmware or a hardware component that receives the output Un.p from the shift operator component 102.

The output of the shift operator component 102 can be an unsigned (U) twos-complement fixed point binary value, where n is representative of a number of n integer bits, and a number of p fractional bits, denoted as (Un.P). The output of the shift operator component 102 can also be provided to a multiplexer 114 for determining the output of the neuron 100 via path 120. This path 120 can be used to select a most significant bit (MSB) to obtain the most information, which can also be used to determine whether to obtain a positive or negative result.

The second shift operator component 106 can receive a first output portion (as an unsigned U number of fractional bits (U0.$p$)) of the Abs component output (as an unsigned U number of n integer bits and number of p fractional bits (Un.p)), while the decoder component 108 receives a second output portion (as an unsigned number of integer bits (Un.0) of the Abs component output (Un.p). The first output portion U0.$p$ is the unsigned p fractional bits, while the second output portion Un.0 is the unsigned integer bits of the Abs component output (Un.p). The second shift operator component 106 can be configured to perform a bit shifting operation (e.g., a right shift or the other shift). The n bits from the output (Un.p) has n bits coding unsigned n number of integer bits, a zero fractional bit value and those n bits can be used to shift by y+one (y+1), for example. In a shift-right operation, the plus one part can be a constant so that it is zero cast. The shift operator component 106 can be configured as a firmware operation instruction or a dedicated HW block, depending on the width x and how many bits y has as how many possible places the input (U0.$p$) is being shifted to. For example, the shifting can be at or below 16 shift possible places, as a small variable shifter 106.

In a bottom path, Un.0 can be provided to an input of the decoder 108 for a decoding operation as $1-2^{-x}$, which can describe the bit path as being implemented in two's complement arithmetic by leading zeros in one or more bitwise operation(s). The complex seeming expression $1-2^{-x}$, when computed as an unsigned U0.$m$ fixed-point binary value, can be simply an m bit bit-vector where the most significant bit (MSB) and all other bits except the x-th left-most are zero, and thus configured a one bit into a particular position. The decoder component 108 can be a decoder circuit, or a microprocessor that can shift and subtract. As such, the decoder component 108 can be implemented using a simple decoder circuit or a simple shift-and-subtract calculation using a microprocessor, for example.

The bitwise operator 110 can receive inputs U0.*m* as unsigned inputs with zero integer bits and an m number of fractional bits. For example, the bitwise operator 110 can be configured to perform a bitwise OR'ing operation. An output of the bitwise operator 110 can be provided to the multiplexer 114 and to a negating component 112. The negating component provides a negation value of the output of the bitwise operator 110 to the multiplexer 114. The output of the multiplexer as selected by path 120 for the MSB according to a negative or positive result. The output S1.*m* indicates a signed (S) twos-complement binary value.

In an aspect, the operations or components of the neuron 100 can be absent of, or without, any multiplication (multiplier), division (divisor) or any operator that inherently has a complexity greater than a linear factor of the number of bits being processed or operation upon. As such, the output can be a (dis)continuous piece-wise linear saturating activation function that can be computed using only bit-slicing, bit-shifting and (optionally) increment operations. The operations of the neuron 100 can be implemented in digital hardware only with considerably fewer resources than with memories and multiply/divide operations. In particular no look-up table is utilized via the neuron 100 for an output providing non-linearity as a function of the linear input X, for example. The neuron 100 can be implemented efficiently in firmware on small embedded microprocessors (or semi-programmable) lacking hardware support for fast multiplication and division without divider/multipliers.

In mathematical notation a replacement for tanh and similar activation functions "tanhpwl2" can be defined or represented as follows:

$$nhpwl2(x) = sgn(x) \times \left(1 - \frac{1}{2^{\lfloor|2X|\rfloor}} + \frac{frac|2x|}{2^{\lfloor|2X|\rfloor+1}}\right);$$

where: a) sgn(x) is the sign of a x (−1 for x<0, 1 otherwise); $\lfloor x \rfloor$ is the largest integer less than or equal to x; frac(x) is the fractional part of a number x (i.e. $\lfloor x \rfloor$−x); and |x| denotes the absolute value of a number.

Various embodiments of the neuron 100 can be utilized, for example, in dedicated digital hardware for a unit of general-purpose, programmable graphics processing, or neural processing units. In an aspect, other than the absolute value 104 and negation operation(s) 112, all other components/operations can be configured as simple bit-manipulation operations (e.g., bit-slicing/concatenation/mux/demux). The complex seeming expression 1−2⁻ˣ of decoder circuit 108, when computed as. U0.*m*, the unsigned fixed-point binary value, as an m bit bit-vector where the MSB and all other bits except the x-th left-most are zero. As such it can be implemented using a simple decoder circuit or a simple shift-and-subtract calculation using a microprocessor.

In an aspect, expensive mathematically accurate functions can be approximated without any look-up table. A similar sigmoid (S)-shaped function that is in-expensive (cheap) to implement can be used by processing straight piecewise linear chunks that have overall an S-shape curve, but can be calculated efficiently based on bit-twiddling or shifting bits. All the components of the neuron 100 can be implemented digitally in digital hardware.

Figure 2:
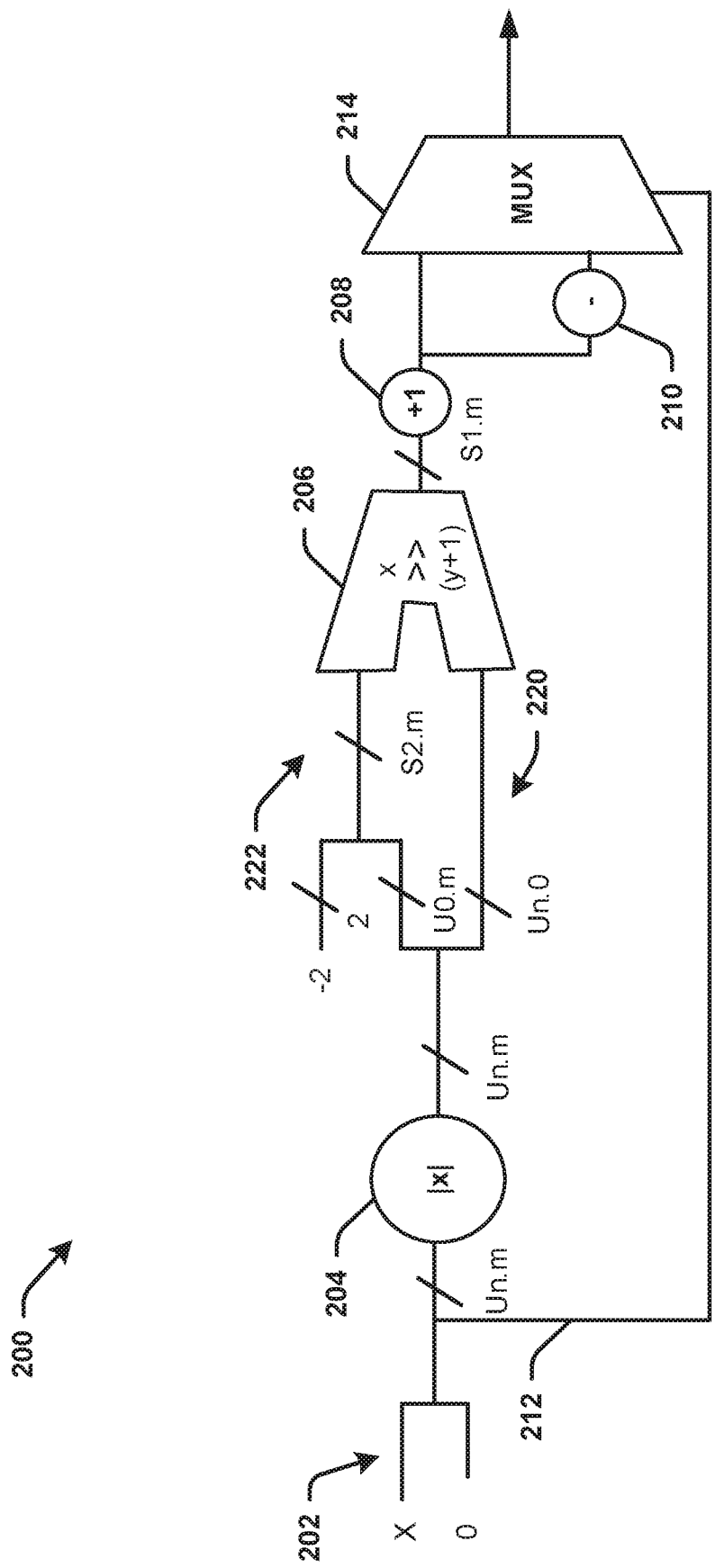
FIG. 2 is another block diagram illustrating another neuron component or configuration of a recursive ANN according to various aspects described.

Referring to FIG. 2, illustrated is another example structure of a neuron component 200 of an ANN system according to aspects/embodiments herein. One or more inputs 202 are received at an absolute value component 204 and the multiplexer 214. The absolute value component 204 receives one or more inputs Un.m, where Un.m indicates an unsigned twos-complement fixed-point binary value with n integer bits and m fraction bit. Sn.m similarly indicates a signed (s) twos-complement binary value number of n and m bits. These bits can be utilized for fractional point implementations by providing fractional point outputs based on inputs with fractional bits, for example.

The absolute value component 204 provides an absolute value of the input(s) X as a binary representation, which can be a factor of 2 X and can correspond to appending a least significant zero bit thereto, as a hardwired bit to the value. In one aspect, the input is (Un.m) used to select an MSB at path 212 for determining a positive or negative resulting output of the neuron component 200 at the multiplexer 214 as a bit-wise operator. The absolute value component 204 provides an absolute value output to different paths of a shifter or a shift operator component 206, and can comprise a multiplexer or other logic component for obtaining an absolute value for the activation function being formed by the neuron structure 200.

With the absolute value obtained, a replacement for a Tanh or similar activation function can be further determined by the neuron 200. This activation function "tanhpwl2" can be represented as follows:

$$nhpwl2(x) = sgn(x) \times \left(1 - \frac{1}{2^{\lfloor|2X|\rfloor}} + \frac{frac|2x|}{2^{\lfloor|2X|\rfloor+1}}\right),$$

where: a) sgn(x) is the sign of an x (−1 for x<0, 1 otherwise); $\lfloor x \rfloor$ is the largest integer less than or equal to x; frac(x) is the fractional part of a number x (i.e. $\lfloor x \rfloor$−x); and |x| denotes the absolute value of a number.

The shifter operator component 206 can shift the input(s) X right by y+1 bit positions, for example, or other shift amount based on a combinational logic. The absolute value component output (Un.m, an unsigned twos-complement fixed-point binary value with n integer bits and m fractional bits) is provided in two different paths as inputs to the shifter 206. The top input to the shifter 206 comprises two bits plus m fractional bits that are signed or of a sign value represented as S2.*m*.

A lower input path 220 to the shifter 206 comprises a number n of unsigned integer bits, while a top path comprises a number m of unsigned fractional bits being prefixed or joined to bits of binary representation of minus two, two bits wide, or a zero plus two binary bits in a signed binary presentation. The n integer bits are a result of performing a floor operation. A floor operation of a fixed point fractional binary value can include tossing away all the m fractional bits, which is where the data path that is n bits wide leads. This becomes the shift input to the shifter 206 as the bottom path through the shifter for a shift right operation being performed.

The shifter operator component 206 can shift the input(s) X right by y+1 bit positions, for example, or other shift amount by combining two paths in a combinational logic. The absolute value component output (Un.m, an unsigned twos-complement fixed-point binary value with n integer bits and m fractional bits) is provided in two different paths as inputs to the shifter 206. The top input 222 to the shifter 206 comprises two bits plus m fractional bits that are signed or of a sign value represented as S2.*m*. On the top path 222 (e.g., S2.*m*), for example, a hardwired constant (e.g., −2 or other constant value) can be provided along with the m fractional bits, resulting in the number of fractional bits m and a constant (c). The shifter 206 then shifts by a value of n positions (similarly to the shifter 106 in FIG. 1). This is how the calculation of adding bits can be performed. Additionally, the tanhpwl2 expression comprises a dividing by two raised to the absolute value of 2x+1 as a bit manipulation that can correspond to shifting the m bits by the n integer as part of tanhpwl2; the expression can be the fractional part of the absolute value of 2x minus two, with the plus one path as a fixed offset. The output of the shifter 206 can be that fractional expression inside the large brackets of tanhpwl2 (e.g., frac |2x|). In particular, once the two paths 220 and 222 are split the n path 220 can effectively be the absolute value of 2x being passed along, while the shifting operation (e.g., shifting right) can be equivalent to dividing by a power of two based on the floor, or the integer path of twice the original value.

In an aspect, the shifter 206 can be a barrel shifter configured to perform a shift operation by taking a fraction part minus two or other constant, or others twos complement arithmetic operation as combinational logic. Because the shifter 206 is operating with a relatively small amount of the bits, the number of shift positions could be no more than 16, such as 8 or smaller. The n in the data path 220 could be three or four bits, or even less, for example.

As such, the shifter 206, as a barrel shifter or other shifter, is configured to perform adding and bit twiddling/manipulation operations, which is the fraction inside the large brackets of the expression/representation of the activation function tanhpwl2 as the output of the shift component 203. At this point, the output can be positive or negative of the original sign of the input value X. The output (S1.m) of the shifter 206 is provided to the incrementor 208 (e.g., plus 1, or other increment/decrement value) where S1.m can be incremented or decremented. The output of the incrementor or increment component 208 is provided to a first input of the multiplexer 214 and a second input provided to a negation component 210 that further provides a negated output/logical complement to the multiplexer 214. With the negation of the shifter output value, a twos complement operation can be utilized such that if a bitwise, twos complement value is taken a minus is obtained, the negation of one plus the shifter output value. The output of the MUX 214 can comprise a continuous non-linear output.

In another aspect, the neuron structures (e.g., neuron component 100, 200, or otherwise herein) can avoid expensive mathematically accurate functions, and approximate them with a similar S-shaped function that is very inexpensive to implement with straight piecewise linear chunks that have overall an S-shape but can be calculated efficiently by what amounts to bit-twiddling, or bit shifting with digital hardware, without many multipliers.

As such, an alternative simplified piecewise linear function or piece-wise saturating activation function that comprises a discontinuous first derivative can be configured in the neuron of the ANN. The output as a non-linear output can be a saturating curve that does not have a continuous derivative, for example. Thus, the output includes discontinuities in a curve, or not continuously smooth. The neuron 200, similar to the neuron 200, can be configured to output from one ANN layer to another, and configured to utilize no look up table, no anchor points for look up, no gradient or interpolation operation. Further, all the components of the neuron 200 (or 100) can be digitally implemented with bit-wise operations, with one or more of only: a bit-slicing operation, a bit-shifting operation, or an increment/decrement/addition/subtraction operation alone. Thus, no multiplication or division components are utilized in the neuron configurations to provide non-linearity for the embodiments.

Furthermore, there is no use of a pre-computed value or values by the neuron(s) (100 or 200). The operations producing the activation function for non-linearity in closed form consists of: increment by one or other value (e.g., 2), take the floor, absolute value, multiply by two, and all as bit-wise operations, rather than arithmetic logic operations: addition or multiplication. Thus, the activation function of the neurons as an output can be implemented at a very low gate cost without any look-up table (LUT) to obtain a piecewise linear result as a sigmoid (S) shaped function.

In another embodiment, only bit-manipulation operations are utilized also if input/out is in signed-binary format or (for twos-complement) approximating $-x$ bit $\sim x$ (inverting all bits). The logistic sigmoid function (usually written σ) can be computed in terms of or as a derivation of tanh as:

$$\sigma(x) = \frac{\tanh(x) + 1}{2}.$$

A replacement for this function "sigmapwl2" can be derived as a derivation of a hyperbolic tan function in similar way as FIG. 2 from the tanh alternative:

$$sigmapwl2(x) = \frac{\tanh pwl(x) + 1}{2}.$$

Figure 3:
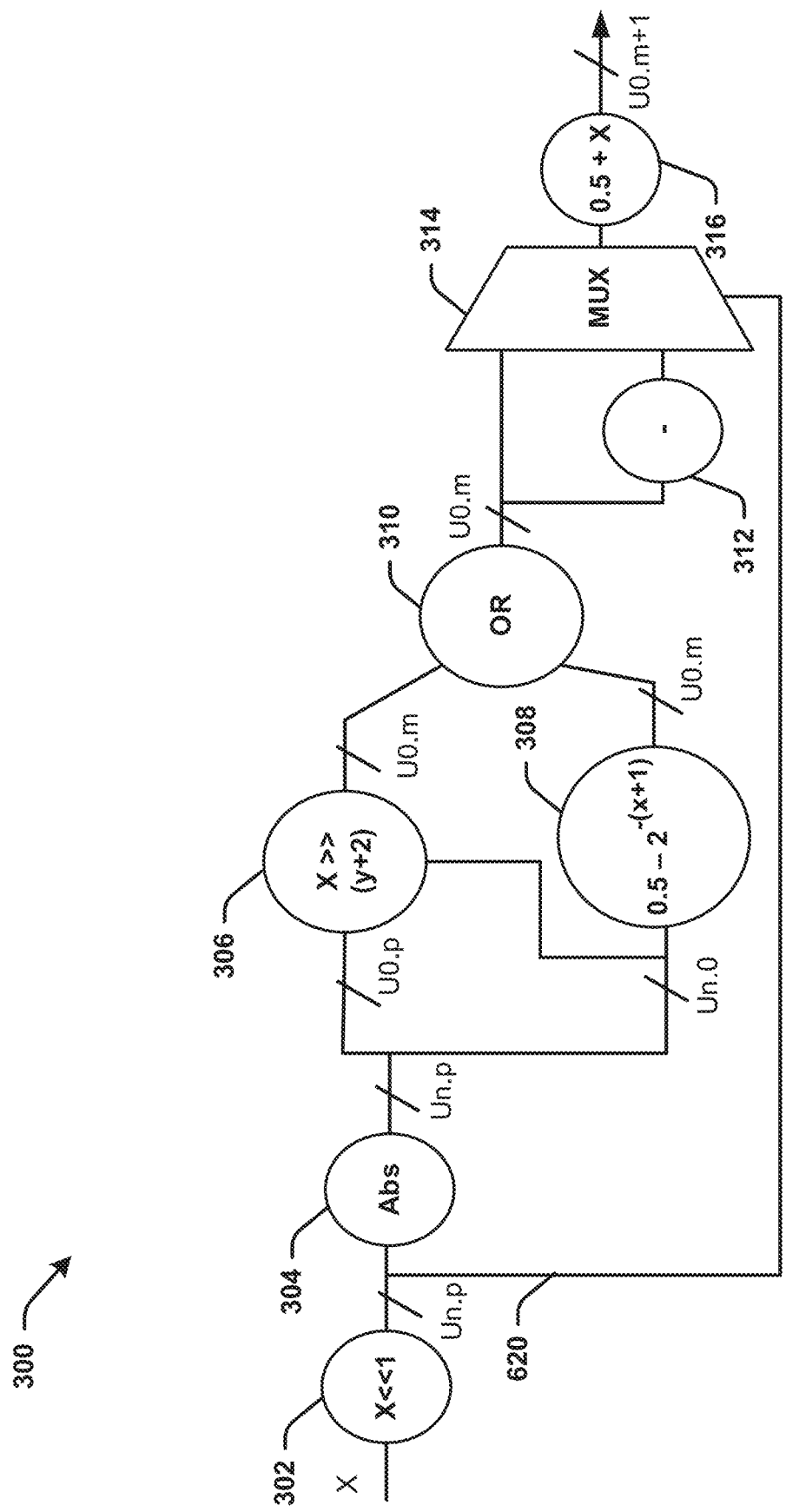
FIG. 3 is another block diagram illustrating another neuron component or configuration of a recursive ANN according to various aspects described.

Referring to FIG. 3, illustrated is another example neuron configuration 300 for ANNs according to the various embodiments herein. An output of a shift operator component 302 is coupled to an input of an absolute value component 304. An output (Un.p) of the absolute value component 304 is coupled to an input of a shift operator component 306 and an input of a decoder component 308. A bitwise operator 310 receives outputs (U0.m, U0.m) from the shift operator component 306 and the decoder component 308, respectively. An output of the bitwise operator 310 is coupled to a negating component 312 and to an input of a multiplexer 314. The negating component 312 further provides a negated output/logical complement of the bitwise operator 310 to the multiplexer 314. Based on an output of the shift operator component 302 the multiplexer 314 selects an output (U0.m+1) to provide for further analysis to another neuron or ANN layer along with the path 320.

The neuron configuration 300 is similar to FIGS. 1 and 2 with the sigmoid S function so that similar operations are implemented with different constants to obtain an S-shaped value between zero and one, rather than a minus one and plus one bit value. The two operations can be scaled invariants of one another, but t=used for different purposes in different places in neural networks.

At the bottom path (Un.0) the decoder component 308 comprises the value 0.5 that in binary can be a single bit, a half, or just a fractional bit minus and then it is $-2^{-(x+1)}$ for the expression $0.5-2^{-(x+1)}$. The operation or operator here can comprise setting this one bit into the bit vector, except the bits with slightly different bit setting. The bits can be positioned all one to the right one binary decimal point position further. A slightly different offset is being utilized a padded value that is added at the output by the offset component 316 configured as 0.5+X as well to give the output as an unsigned fractional value (e.g., U0.m+1) as a non-linear output that can be continuous. The hardware components of FIG. 3 can implement a final additional by a one bit adder, for example. Similarly, no explicit additions are required for the shift right (>>) or $(0.5-2^{-(x+1)})$ operation, while interpreting all m+1 outputs bits as coding the fractional part of a fixed-point binary number, also connecting the outputs to other neurons or ANN layers, for example.

In an aspect, one or more of the neurons (100, 200, 300) can be implemented in combination or by themselves within an ANN layer of a recursive ANN. A recursive neural network can be a deep neural network created by applying the same set of weights recursively over a structured input, to produce a structured prediction over variable-size input structures, or a scalar prediction on it, by traversing a given structure in topological order. The neurons (100, 200, 300) can be configured to be coupled either indirectly by implementing one and performing a scaling to get the other, called scaling by powers of two and offsetting by a fixed amount, or directly as well.

The neuron 300 can be configured as a direct implementation of the logistic sigmoid. Only bit-manipulation operations are utilized if input/out is in signed-binary format or (for twos-complement) approximating −x bit ~x (inverting all bits). The logistic sigmoid function (usually written σ) can be computed in terms of tanh as:

$$\sigma(x) = \frac{\tanh(x)+1}{2}.$$

A replacement for this function "sigmapwl2" can be derived in similar way as FIG. 2 from the tanh alternative:

$$sigmapwl2(x) = \frac{\tanh pwl(x)+1}{2}.$$

In various embodiments of neurons 100, 200 or 300 a nonlinear activation function that can be embodied in digital hardware for recursive neural networks. This can be implemented by replacing the textbook idealized mathematical S-shaped nonlinear functions with these neurons, and obtaining similar or same performance in the final network, while being able to train it where it converges and so forth. The hardware to implement it, the activation function part is less expensive, rather than using multiple multipliers, r multipliers for addresses, and a look up table memory, and instead a small chunk of hardware that is basically dominated by a single small shifter (e.g., a barrel shifter or other shifter). The neurons configurations 100, 200 or 300 comprise a low hardware implementation costs with a very small number of gates, formulated as a low gate count, saturating nonlinearity. Such low gate count can be in terms of per bit width, dominated by the shifter (e.g., 106, 206, 306) so gate counter is dominated by whatever the shift in a microcell or neuron is, as dominated by n, essentially n layers of multiplexers with m×n multiplexers, based on the number of ANN layers there are for the neural network. The neurons could be implemented as arithmetic logic functions to implement ANNs as well as a dedicated block for each layer, and physically laid out the neural network each on a chip for a parallel implementation.

In various embodiments, the neuron component structures herein (e.g., 100, 200, 300 or the like) can be configured as a piecewise linear function where the output curve performance can be close to the mathematically ideal for the class of small recursive ANNs with one or more ANN layers. The output in particular can be seen in FIG. 4 at the curve and graph 400 where an ideal curve 404 and a simulated curve 402 generated as an output of any one or more of neuron configurations 100, 200, 300, or the like. Bar graphs are illustrated to the right with an ideal graph 406 and a piecewise linear (PWL) graph of the activation function output based on log base 2 generated by the neurons 100, 200, 300, or the like are also illustrated.

The curve 402 of the neuron activation function (kinky) illustrates a close similarity to the ideal activation function curve 404 (tanh). In particular, the curve 402 demonstrates a few minor kinks or offsets from the ideal as an output, for example, of the replacement for the Tanh or similar activation function as the activation function ""tanhpwl2", which is an alternative S shaped piecewise linear saturating activation function generated by the neurons embodied herein. Alternatively, or additionally, the logistic sigmoid function can be replaced by the activation function "sigmapwl2" discussed herein, and be configured in terms of the Tanh and similarly derived.

Figure 4:
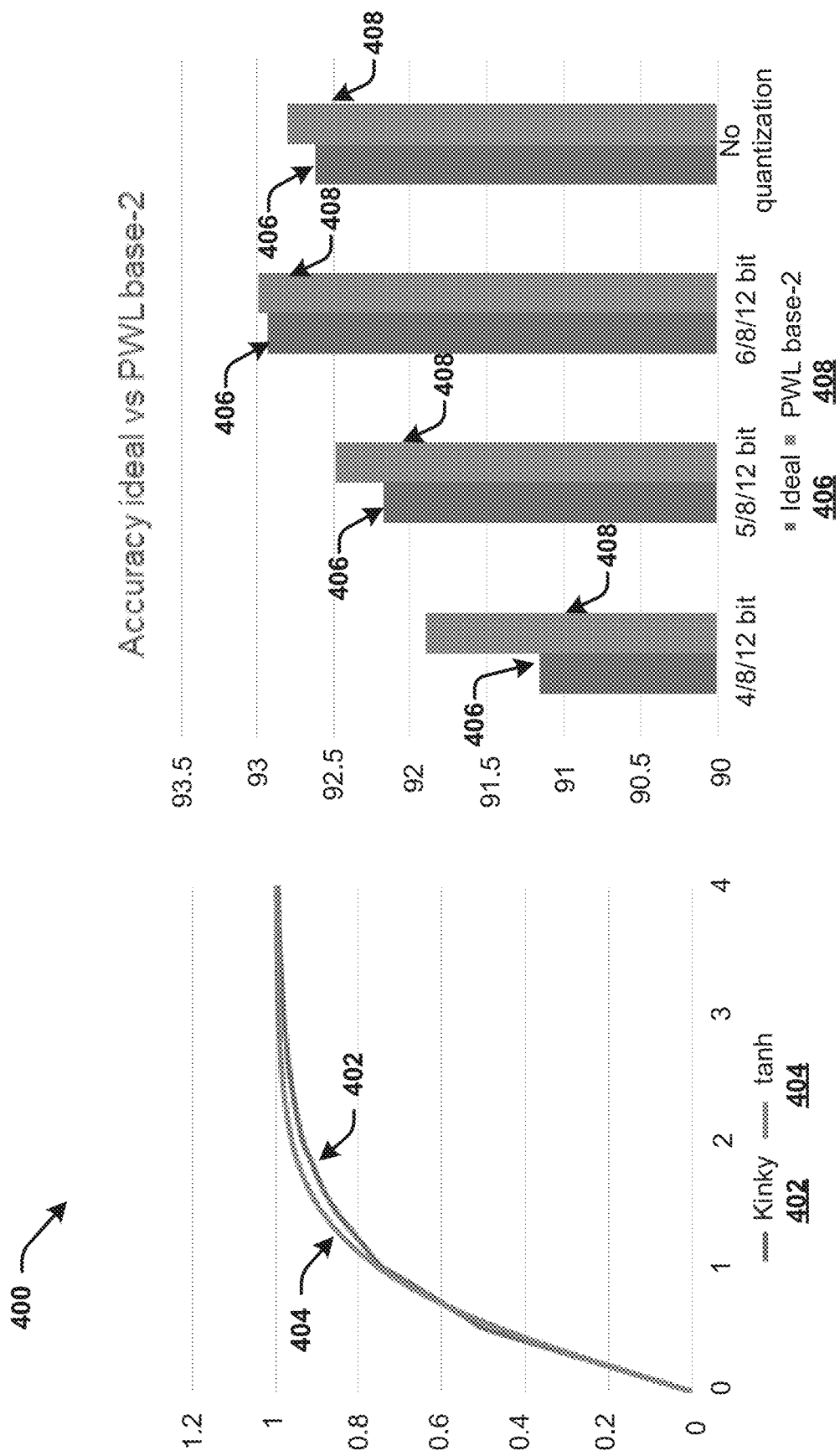
FIG. 4 illustrates performance comparison graphs of activation functions performed by one or more neuron components of a recursive ANN according to various aspects described.

As can be seen in FIG. 4, the "kinky" sigmoid S shaped piecewise linear saturating activation function can provide a better performance than the ideal 404, 406. The activation function 402, 408 does not have a continuous derivative, or, in other words, has a discontinuous first derivative. The activation functions 402, 408 can be performed by the neurons 100, 200, 300, or the like without any anchor points (or memory entries) to be referred to, as in a LUT, or any gradients to be performed as in an interpolation between points of a LUT or particular polynomial or linear segments, for example. The neurons thus operate without any multipliers or dividers and with only bitwise operators/operations by performing bit-twiddling, bit-slicing, adding, subtracting, incrementing or decrementing.

In particular, in ANNs not requiring high-precision bit values, (i.e. 16 or less), small integer values can be used with the neurons of one or more ANN layers. In one example, the 5/8/12, 6/8/12 bit accurate hyperbolic tangent or activation function herein can have a half of a percent accuracy, as seen in the noise level. This provides an accurate measurement, and thus, a half a percent accuracy or performance loss can be an acceptable trade off while lowering energy consumption.

Figure 5:
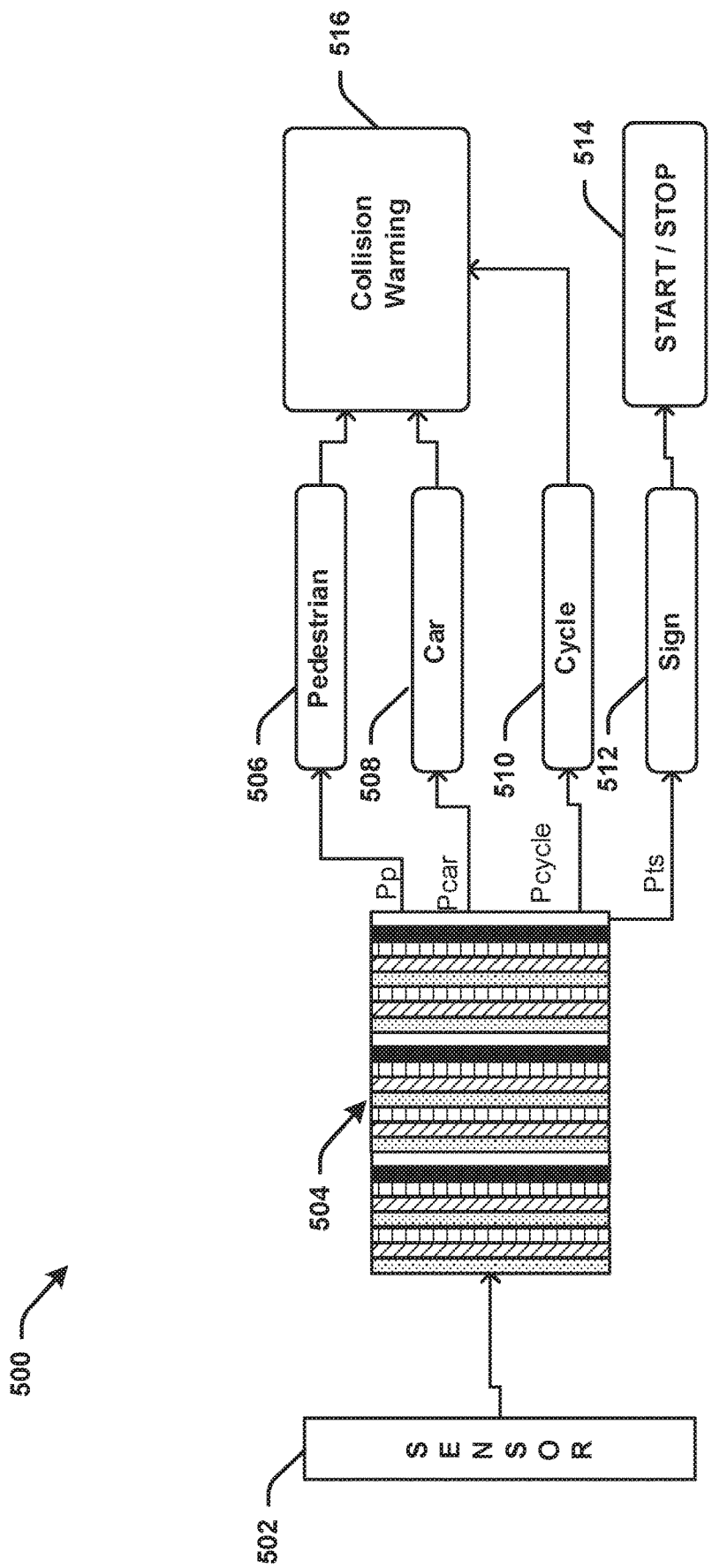
FIG. 5 illustrates a block diagram illustrating a recursive ANN system according to various aspects described.

FIG. 5 illustrates an example of an ANN system 500 that can reliably classify images or other object data into certain categories/classes allowing driver assistance systems or other neural network systems with neuron components (e.g., 100, 200, 300, or the like) to perform critical decisions such as reduction in engine speed, braking, halting, or other functions involving an automobile, other vehicle or device, for example. ANN 500 can operate as an automated navigation system 500, language processing system, or other ANN application, for example, and can include one or more sensors 502 providing data sets as inputs to ANN layers 504 that include multiple different computational/processing layers with various neuron components embodied herein. The ANN layers 504 then provides outputs to one or more advanced drive assistant system (ADAS) detectors 506-512 (e.g., a pedestrian detector 506, a car detector 508, a bicycle or motorcycle detector 510, a traffic sign detector 512 or other detector) that detects whether a condition is present in relation to a category (pedestrian features, car features, cycle features, traffic sign features, etc.) of data corresponding to any one detector 506-512. These detectors are described here as an example, but other detectors, sensors or classifiers for other ANN applications are also envisioned as one of ordinary skill in the art could appreciate.

Based on whether a given detector determines a condition is present from the output data of the ANN, the detector 506-512 can signal for an application such as a collision warning 516, a braking function to stop/slow, other operation to start/stop or other application function associated with a function for responding to the condition as part of automated vehicle navigation or the other system/device function, for example.

In one example, the sensor(s) 502 can include an image capturing device such as a camera, radar, light detection and ranging (LIDAR), other image scanning devices, or other sensors for detecting and processing data from images, such as those received on the signals from an image capturing device, or other data gathering device. Data sets from the sensors 502 can be then provided to ANN layers 504 to process the signals and determine what data the signals are presenting. For example, a car driving on a highway with front-camera sensor attached could return pictures/images of a traffic sign, if there was one, or a lamp post. For example, if there was a car driving ahead, then possibly the pictures of the car would also be returned as part of the sensor data.

Figure 6:
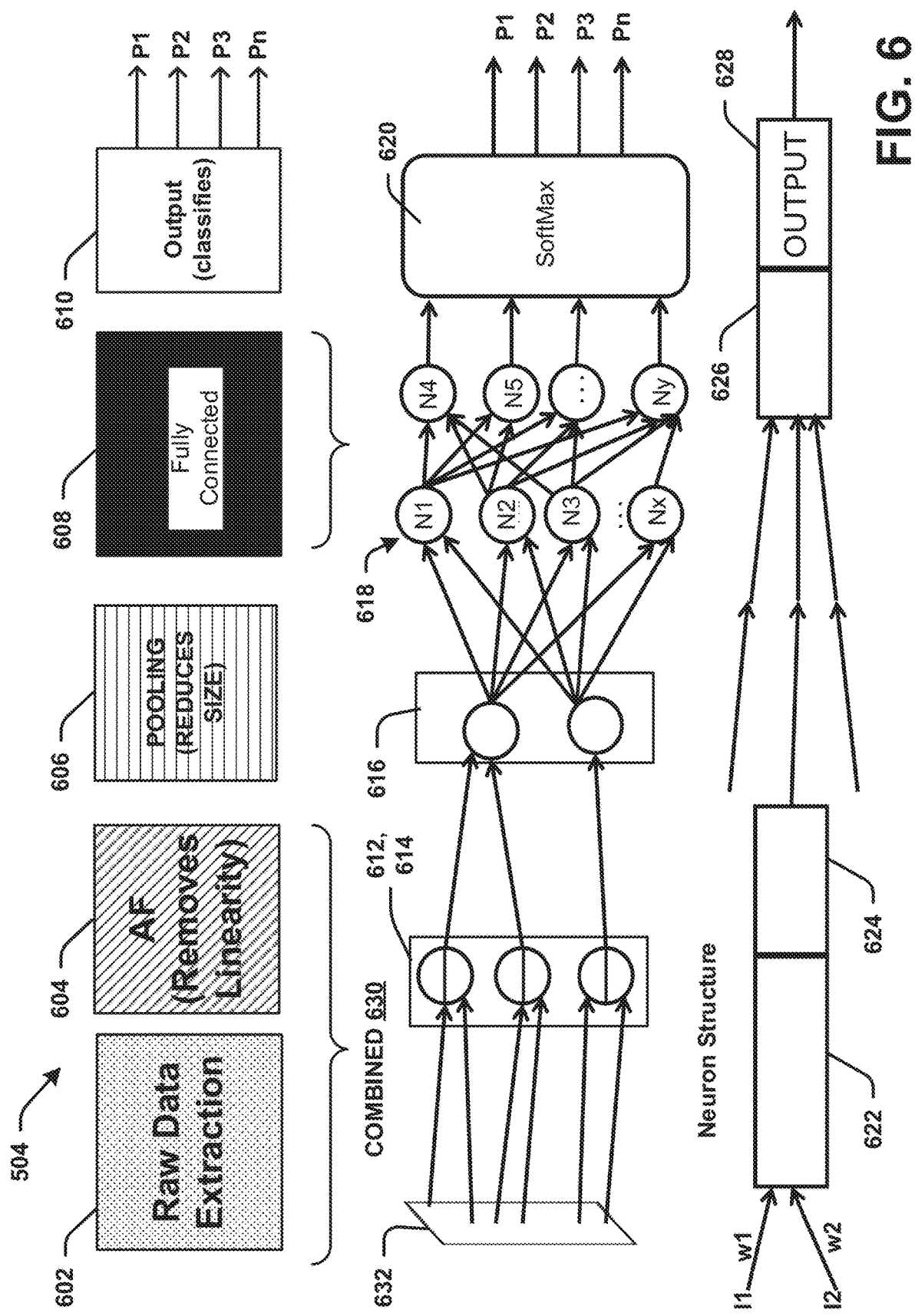
FIG. 6 illustrates another block diagram illustrating the ANN according to various aspects described.

The ANN layers 504 can accept data for training the neural network with neurons 100, 200, 300, for example, that is inputted in any various formats from images, videos, text, speech, sounds, number data or the like as raw data 602 as illustrated in FIG. 6, while other deeper/hidden layers can comprise convolutional and pooling layers (e.g., layers 602, 604, 630 or 606) for processing as neurons or processing components, for example. Convolutional layers 604 of FIG. 6 can detect local patterns and features in data from previous layers, while pooling layers 606 merge similar features into one set of data. Output layers 610 can then present network results that can be controlled by activation functions of neurons 100, 200, 300 to perform classifications or predictions with associated probabilities from a fully connected layer 608. The position of the activation function(s) in a neural net structure can depend on its function such that any of neurons 100, 200, or 300 can be located at any one of layers 604 thru 610, or other layers. When placed after hidden layers, for example, the activation function(s) of neurons 100, 200, 300 can convert learned linear mappings of data into non-linear forms, while in the output layer operate for predictions, for example.

In autonomous driving systems, for example, with a driver taking a backseat, a lot of the decisions that a human would have taken, such as slowing down, applying the brake, sounding the horn, or other actions can be done by the automated navigation/piloting system, with the specialized computer processing components on board, and for them to decide what is to be done next, as it is important to understand what is lying ahead of them. As such, a primary objective of the system and the ANN layers 504 is to determine what is contained in these pictures/images/object data as raw data of one or more objects, and then based on what is found in this data, implement further decisions.

For example, if analysis of one or more pictures/images indicates a condition/pattern in the images that a human being is present in the middle of the road, then the on-board computer could decelerate and possibly bring the vehicle to a stop accordingly. Alternatively, if a determination is made to accelerate based on the condition within the images, then it would simply direct the vehicle to change lanes, and then accelerate. As such, these decisions, or other decisions can be derived from the nature of the data analyzed within the data or images as patterns of features that are returned back by the system and then analyzed for any number of given conditions being present in the images or not. The system can be robust with the initial training of filters or kernel filters while learning to detect possible variants to recognize conditions among various circumstances.

ANN layers 504 can include a series of different computations that can be connected and dependent to one another as ANN computation layers, including various neuron components to provide results of the computations of a given layer to the next layer. These layers can be seen in FIG. 5 as various layers in the ANN 504 block with different marking/shading, which also correspond to layers 602 thru 610 of FIG. 6 to illustrated association, respectively. At the end of the computation pipe emerges the outputs (e.g., Pp, Pcar, Pcycle, Pts, or P1 thru Pn in FIG. 6) that can include different probabilities from among the various possible conditions within the image(s) or a sector subset of the image(s). By summing up these probabilities, the values obtained can equal to one, for example. The object type or category/class type with the greatest probability then can be the one in which the image or image sector corresponds to, be detected as such by one or more detectors 506-512, and acted upon by one or more of the applications 514 and 516, or other application.

For example, if the image contained a pedestrian, the pedestrian ADAS detector 506 can be configured to send a signal to a braking system to apply brakes. Any number of items could be detected within the image by one or more detectors 506-512, not just a pedestrian as an example. Further, in response to a pattern of an object/category type being detected by the convolution neural network system, a signal can be provided that triggers a component to make further decisions based on one or more predefined criteria.

For example, the pedestrian detector could send an image message to a collision warning component/system indicating that a pedestrian is being detected. The collision warning system could instantly take cognizance, possibly apply a brake to slow down, slow a vehicle while moving to a direction to the right or left, or another decision based on the pattern recognition of the pedestrian in the image, thereby avoiding a fatal collision. Similar example can be made out of other patterns or conditions being detected within the images from sensor data, such as a car, a cycle, a traffic sign, or any other external pattern triggering an action upon being detected.

FIG. 6 is a further example in greater detail of the various computation layers making up the ANN layers 504, in particular. The ANN 504 can comprise a number of computational layers, including, for example, convolution layer 602, an activation function (AF) layer 604, a pooling layer 606, a fully connected (FC) layer 608, and an output layer 610. Although five computational layers are demonstrated, more or less computational layers can be envisioned as one of ordinary skill in the art could appreciate. A layer, or computation(al) layer, as used herein, can refer to one or more neuron components that operate with similar function by mathematical or other functional means to process received inputs to generate/derive outputs for a next layer with one or more other components for further processing within a neural network system.

The convolution layer 602, for example, can include one or more convolution/ANN components 612 that extract data slices of an image 632 as data sets. The convolution layer 602 can be combined with the AF layer 604 to also be considered or referred to as one computational neuron layer 630, or, in general, as separate hidden layers 630 with connected neuron components. In particular, convolution operations can be performed by the convolution component(s) 612 to extract features from images being received as inputs from input terminals thereat, such as camera data, radar data, other sensor data or the like. For example, a human face or other feature can be detected from among convolutional data generated by the convolution operations as results outputted by the convolution component 612. The convolution processes can be performed on sets/segments/subsets/portions of the image data, for example, along sections of an image 632 for a particular feature. Initially at first pass, the convolution operations generated by the convolution component 612 can extract low-level features.

Because convolution operations can be linear, the convolution layer 602 does not completely and always reflect what could be considered real world behavior, which does not typically follow a fixed path and is usually random. Thus, to generate the output of convolution with more randomness, an AF layer 604 can be configured into the ANN system 504, and further combined as part of the combined convolution layer 630, or as separate layers. The convolution components 612 can be connected to layer 604, for example, as single neurons or separately. AF components 614 can be configured to generate sets of non-linear output data by removing linearity from the data outputted from the convolution components 612 to nonlinear output with a sigmoid (S)-shaped curve based on the outputs of any one or more of neurons 100, 200, 300 herein.

With the features extracted and linearity removed or nonlinearity introduced without any LUT, multipliers, dividers, or interpolation, for example, the pooling layer 606 at pooling components 616 can receive the nonlinear output data and make it scale invariant. The pooling components 616 are configured to generate pooling outputs via a pipelining process in parallel with the convolution combined layer 630. In an embodiment, pooling components 616 can initiate processing for scaled invariants and perform statistical operations on the first set/subset of convolutional data or the nonlinear convolutional output data. These pooling components 616 perform statistical operations on the non-linear output data based on a pooling window for a subset of the non-linear output data. Pooling operations can reduce the size of the input data (non-linear output data) provided by the AF layer 604. As each subset of data is received, a single set of nonlinear convolutional output data can be processed, reduced in size at the pooling layer 606, and then subjected to classification at a fully connected (FC) layer 608 and eventually converted to human understandable form by a classifier 610.

The FC network layer 608 includes FC components 618 that can identify a different set of values, then the ANN system output can be detected as something other than a particular probability candidate that the picture/image/other object is containing. As such, the outputs of the FC components can then be converted into probabilities by what is known as the output layer 610 and fed to various detectors (e.g., 506-512 of FIG. 5) and actions taken in response at the applications 514 or 516, for example.

A neuron structure, for example, at a higher level of abstraction than neurons 100, 200, 300 can be configured by net functions 622, 626 and output functions 624, 628 according to any particular ANN layer. The outputs of each neuron (e.g., N1-Nx and N4-Ny) or other components at other layers 504 can be dependent on the availability of input data (e.g., I1, I2) and input weights (e.g., w1, w2), instead of a program counter and outside instructions being fetched, for example. This means that each neuron component at an ANN layer can include one or more data flow processers that operate without necessarily fetching an instruction from a memory (or LUT), but process data in response to an availability of input data at one or more inputs (e.g., I1, I2) in order to instantaneously process the input data by performing a designated AF. The inputs (e.g., I1, I2) can be provided by the outputs of a preceding layer of data being available at FC2 component inputs (e.g., I1, I2).

Each net function 622, 626 of neurons can comprise a mathematical operation, such as a dot product of the inputs and weighting by weights (as a weight factored to each input). The inputs (e.g., I1, I2) can be the same and the weights (e.g., w1, w2) vary. Further, a sum of the dot products of the inputs (I1, I2) and weights (e.g., w1, w2) of each input (I1, I2) can also be performed at each neuron of the AF layer 604, or other layers of the ANN layers (e.g., 504). Different neuron structures can have different weights (e.g., w1, w2), or, alternatively, different inputs (I1, I2) can have different weights (e.g., w1, w2) differently for each receiving the same group/set/plurality of inputs (e.g., I1, I2), or be the same. Additionally, or alternatively, these weights can be similar or different from one another, such that at least some neuron could have the same weights (e.g., w1, w2) at the inputs, while other neuron components have different weights (e.g., w1, w2) from one another with different values giving weight to or any amount for factoring/considering a corresponding input in processing.

Additionally, the output function of each neuron can take the output of the net function, so the output of a net function 624 serves as inputs to the output 628 function of the neuron. The output function (OF) of each neuron can perform a known mathematical functionality (e.g., a sigmoid, a hyperbolic tan, a sign, etc. or other mathematical function according to embodiments of this disclosure) on the output of the net function, and then that becomes the input to the next stage neuron at and so on depending on any number of multiple ANN layers, for example. The output neuron 624, 628 of each neuron can also comprise a mathematical function operating on the results of the net function 622, 626. For example, the output function can comprise a trigonometric function (e.g., tanh, tan, simgapwl2, tanpwl2, etc.) or other mathematical function that is performed on the weighted inputs and the result of a sum or other operation performed thereon.

The output layer 610 can include a classifier function 620 that received FC layer outputs or ANN outputs. These classifier functions could include a SoftMax function, for example, whose function could be to squash/compress the outputs of FC layer 608 to values ranging from 0 through 1. The outputs (P1, P2, P3 . . . Pn) of classifier functions 620 can comprise probabilities, in which the most likely output class corresponding to the input data has the highest probability. The output layer 610 could also be a standard classifier like a support vector machine (SVM), or other classifier, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
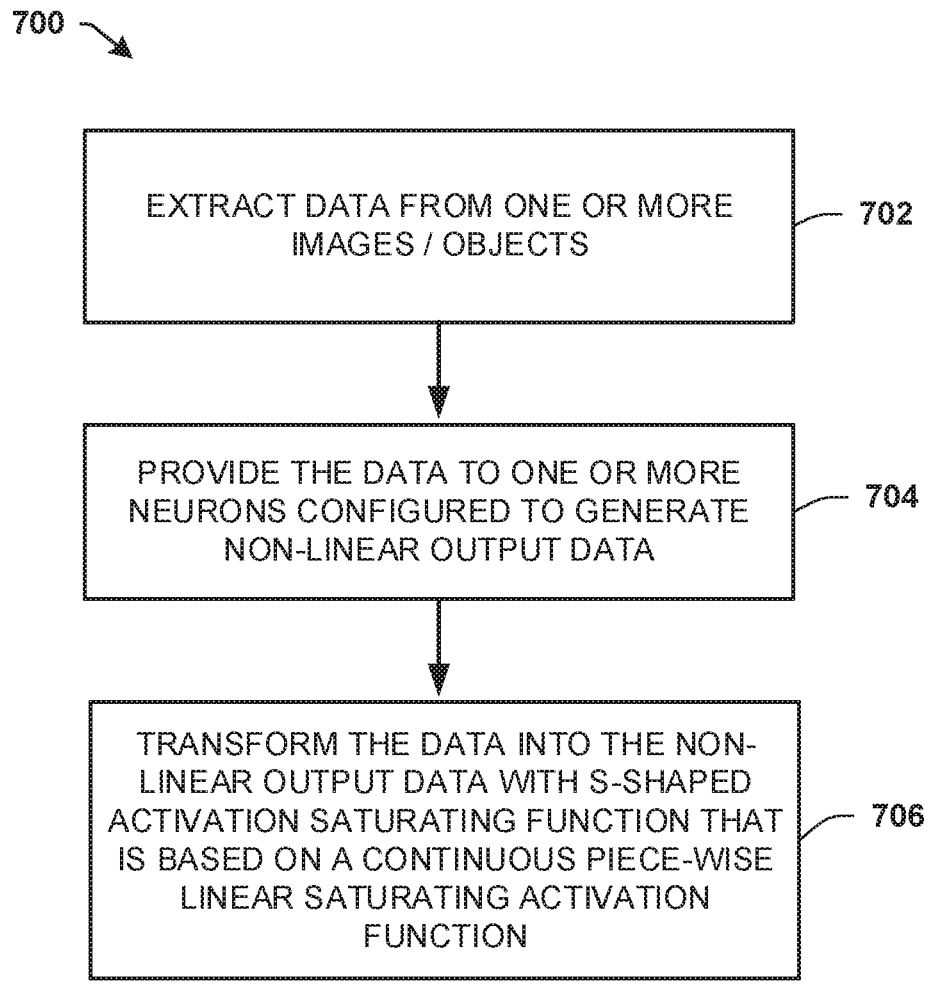
FIG. 7 is a flow diagram illustrating a process flow according to various aspects described.

With reference to FIG. 7, illustrated is a process flow 700 for employing various speed ups with different pipeline processing in an ANN according to various aspects/embodiments/details described in this disclosure. The method 700 initiates at 702 with performing, via one or more processing devices or bitwise operators as neuron components 100, 200, 300, or the like, for operations that extract data from one or more images or objects.

At 704, the process flow 700 comprises providing, via the one or more processors, the data to one or more neurons configured to generate non-linear output data.

At 706, the process flow 700 comprises transforming, via the one or more processors, the data into the non-linear output data with an S-shaped activation saturating function that is based on a continuous piece-wise linear saturating activation function. The data can be generated into the non-linear output data without at least one of: a LUT, a storage of a pre-computed value, a divider, or a multiplier, for example. The neuron(s) computing the activation saturating function can do so with only bitwise operators/operations. Computing the continuous piece-wise linear saturating activation function with the data can be configured by performing one or more bit-wise operations comprising at least one of: a bit-slicing operation, a bit-shifting operation, or an increment/decrement/addition/subtraction operation. The neurons (e.g., 100, 200, 300) can be configured within the ANN without any LUT, interpolation, or entry points to a table or chart for generating the non-linear outputs from one or more weighted inputs (e.g., linear inputs).

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

A first example is an apparatus for an artificial neural network (ANN). The ANN comprising: processing circuitry comprising one or more neurons configured to: receive one or more linear inputs; and remove linearity from the one or more linear inputs based on an S-shaped saturating activation function that generates a continuous non-linear output. The one or more neurons comprise digital bit-wise components configured to transform the one or more linear inputs into the continuous non-linear output.

A second example can include the first example, wherein the digital bit-wise components comprise a shifter configured to shift a number of bits based on combinational logic; and at least one bit-wise operator, coupled to the shifter, configured to provide the continuous non-linear output.

A third example can include the first or second example, wherein the at least one bit-wise operator comprises a multiplexer coupled to an output of the shifter and an absolute value operator coupled to an input of the shifter to provide the one or more linear inputs to the shifter based on an absolute value.

A fourth example can include any one or more of the first through third examples, wherein the S-shaped saturating activation function is based on a derivation of a hyperbolic tan function or a logistic sigmoid function.

A fifth example can include any one or more of the first through fourth examples, wherein the one or more neurons are configured to compute the S-shaped saturating activation function without at least one of: a LUT, a storage of a pre-computed value, a divider, or a multiplier, in an embedded microprocessor.

A sixth example can include any one or more of the first through fifth examples, wherein the S-shaped saturating activation function comprises a continuous piece-wise linear saturating activation function having a discontinuous first derivative.

A seventh example can include any one or more of the first through sixth examples, wherein digital bit-wise components of the one or more neurons are configured to perform at least one of: a bit slicing operation, a bit-shifting operation, or an increment/decrement/addition/subtraction operation to generate the continuous non-linear output.

An eighth example can include any one or more of the first through seventh examples, wherein the one or more neurons are configured to: select a most significant bit from the one or more linear inputs to determine a positive result or a negative result; process a number of integer bits and a number of fractional bits with an absolute value; perform a floor operation by extracting the number of fractional bits to provide the number of integer bits to an input of a bit-wise shifter and the number of fractional bits plus a number of additional bits to another input of the bit-wise shifter; and provide an output of the bit-wise shifter to a multiplexer that is configured to provide an output based on the most significant bit.

A ninth example can include a system to be employed in an artificial neural network (ANN) comprising: an extraction component configured to recursively obtain a plurality of inputs based on extracted data of one or more objects; and processing circuitry, coupled to the extraction component, configured to process the plurality of inputs, via one or more neuron components, and provide a continuous non-linear output to perform a classification operation or a detection operation, wherein the one or more neuron components are configured to modify the plurality of inputs according to an activation function that comprises an S-shaped saturating activation function computed using digital bit-wise operations to generate the continuous non-linear output.

A tenth example can include the ninth example, wherein the one or more neuron components are configured to process a number of integer bits and a number of fractional bits with an absolute value, and perform a floor operation by extracting the number of fractional bits to provide the number of integer bits to an input of a bit-wise shifter and the number of fractional bits plus a number of additional bits to another input of the bit-wise shifter.

An eleventh example can include any one or more of the ninth through tenth examples, wherein the one or more neuron components of the processing circuitry comprises a shifter and at least one bit-wise operator, wherein the shifter and the at least one bit-wise operator are configured to digitally compute the activation function to provide the continuous non-linear output without discontinuities.

A twelfth example can include any one or more of the ninth through eleventh examples, wherein the one or more neuron components of the processing circuitry comprises digital hardware only to compute the continuous non-linear output for a determination of whether a neuron of the ANN is to be fired.

A thirteenth example can include any one or more of the ninth through twelfth examples, wherein the processing circuitry is further configured to compute the continuous non-linear output without a LUT or a storage of a pre-computed value.

A fourteenth example can include any one or more of the ninth through thirteenth examples, wherein the S-shaped saturating activation function comprises a continuous piece-wise linear saturating activation function.

A fifteenth example can include any one or more of the ninth through fourteenth examples, wherein the one or more neuron components are configured to compute a continuous piece-wise linear saturating activation function with the plurality of inputs based on at least one of: a bit-slicing operation, a bit-shifting operation, or an increment/decrement/addition/subtraction operation.

A sixteenth example can include any one or more of the ninth through seventeenth examples, wherein a neuron component of the one or more neuron components comprises an embedded microprocessor that is configured to compute the S-shaped saturating activation function without at least one of: a LUT, a storage of a pre-computed value, a divider, or a multiplier.

A seventeenth example can include any one or more of the ninth through fourteenth examples, wherein a neuron component of the one or more neuron components comprises digital bit-wise components that include an absolute value operator coupled to an input of a bit-wise shift operator, and a multiplexer coupled to an output of the bit-wise shift operator, wherein the digital bit-wise components are configured to generate the continuous non-linear output.

An eighteenth example can be a method for an artificial neural network (ANN), comprising: performing, via one or more processors, operations that extract data from one or more images; providing, via the one or more processors, the data to one or more neurons configured to generate non-linear output data; and transforming, via the one or more processors, the data into the non-linear output data with an S-shaped activation saturating function that is based on a continuous piece-wise linear saturating activation function.

A nineteenth example can include the eighteenth example, further comprising: generating the data into the non-linear output data without at least one of: a LUT, a storage of a pre-computed value, a divider, or a multiplier.

A twentieth example can include any one or more of the eighteenth through nineteenth examples, further comprising: computing the continuous piece-wise linear saturating activation function with the data by performing one or more bit-wise operations comprising at least one of: a bit-slicing operation, a bit-shifting operation, or an increment/decrement/addition/subtraction operation.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An apparatus for an artificial neural network (ANN) comprising:
   processing circuitry comprising a neuron configured to:
      receive one or more linear inputs;
      compute an S-shaped saturating activation function without a multiplier; and
      remove linearity from the one or more linear inputs based on the S-shaped saturating activation function to generate a continuous non-linear output;
   wherein the neuron comprises:
      a multi-bit input terminal configured to receive the one or more linear inputs;

an absolute value circuit configured to provide a multi-bit result representing an absolute value of the one or more linear inputs;
a shifter circuit configured to bit-shift the multi-bit result provided by the absolute value circuit; and
digital bit-wise components downstream of the shifter circuit, wherein the absolute value circuit, the shifter circuit, and the digital bit-wise components are collectively configured to transform the one or more linear inputs on the multi-bit input terminal into the continuous non-linear output.

2. The apparatus of claim 1, wherein the digital bit-wise components comprise a multiplexer coupled to an output of the shifter circuit.

3. The apparatus of claim 1, wherein the S-shaped saturating activation function is based on a derivation of a hyperbolic tan function or a logistic sigmoid function.

4. The apparatus of claim 1, wherein the neuron is configured to compute the S-shaped saturating activation function without a look-up table and without a divider.

5. The apparatus of claim 1, wherein the S-shaped saturating activation function comprises a continuous piece-wise linear saturating activation function having a discontinuous first derivative.

6. The apparatus of claim 1, wherein the digital bit-wise components are configured to perform at least one of: a bit slicing operation, a bit-shifting operation, or an increment/decrement/addition/subtraction operation to generate the continuous non-linear output.

7. The apparatus of claim 1, wherein the neuron is configured to:
select a most significant bit from the one or more linear inputs to determine a positive result or a negative result;
process a number of integer bits and a number of fractional bits with an absolute value;
perform a floor operation by extracting the number of fractional bits to provide the number of integer bits to an input of the shifter circuit and the number of fractional bits plus a number of additional bits to another input of the shifter circuit; and
provide an output of the shifter circuit to a multiplexer that is configured to provide the continuous non-linear output based on the most significant bit.

8. A system to be employed in an artificial neural network (ANN) comprising:
processing circuitry configured to:
recursively obtain a plurality of inputs based on extracted data of one or more objects; and
process the plurality of inputs, via one or more neurons, and provide a continuous non-linear output to perform a classification operation or a detection operation, wherein the one or more neurons are configured to modify the plurality of inputs according to an activation function that comprises an S-shaped saturating activation function computed using digital bit-wise operations to generate the continuous non-linear output, and compute the S-shaped saturating activation function without a multiplier;
wherein a neuron of the one or more neurons comprises:
a multi-bit input terminal configured to receive the plurality of inputs;
an absolute value circuit configured to provide a multi-bit result based on the plurality of inputs, the multi-bit result representing an absolute value of the plurality of inputs;
a bit-wise shifter circuit configured to bit-shift the multi-bit result provided by the absolute value circuit, thereby providing a bit-shifted result; and
digital bit-wise components downstream of the bit-wise shifter circuit and configured to transform bit-shifted result into the continuous non-linear output.

9. The system of claim 8, wherein the one or more neurons are configured to process a number of integer bits and a number of fractional bits with an absolute value, and perform a floor operation by extracting the number of fractional bits to provide the number of integer bits to an input of the bit-wise shifter circuit and the number of fractional bits plus a number of additional bits to another input of the bit-wise shifter circuit.

10. The system of claim 8, wherein the processing circuitry is further configured to compute the continuous non-linear output without a look-up table.

11. The system of claim 8, wherein the S-shaped saturating activation function comprises a continuous piece-wise linear saturating activation function.

12. The system of claim 8, wherein the one or more neurons are configured to compute a continuous piece-wise linear saturating activation function with the plurality of inputs based on at least one of: a bit-slicing operation, a bit-shifting operation, or an increment/decrement/addition/subtraction operation.

13. The system of claim 8, wherein the neuron is configured to compute the S-shaped saturating activation function without a divider.

14. The system of claim 8, wherein the digital bit-wise components include a multiplexer coupled to an output of the bit-wise shifter circuit, wherein the digital bit-wise components are configured to generate the continuous non-linear output.

15. An artificial neural network (ANN) comprising one or more neurons, a neuron comprising:
a multi-bit neuron input including multiple bitlines;
an absolute value circuit having an input and an output, the input of the absolute value circuit coupled to the multi-bit neuron input;
a shift operator circuit having a data input, a data output, and a shift control input, the data input and shift control input each coupled to the output of the absolute value circuit;
a bit-wise operator circuit having an input and an output, the input of the bit-wise operator circuit coupled to the data output of the shift operator circuit; and
a multiplexer circuit having a first multiplexer input, a second multiplexer input, a multiplexer output, and a multiplexer control terminal, the first multiplexer input and the second multiplexer input coupled to the output of the bit-wise operator circuit, and multiplexer control terminal coupled to at least one bitline of the multi-bit neuron input.

16. The ANN of claim 15, wherein the bit-wise operator circuit comprises an incrementor circuit or an OR-gate.

17. The ANN of claim 16, further comprising:
a negation circuit having an input and an output, the input of the negation circuit coupled to an output of the incrementor circuit or an output of the OR-gate, and the output of the negation circuit coupled to the second multiplexer input.

18. The ANN of claim 15, wherein the output of the absolute value circuit is an n-bit multi-bit value, and the data input of the shift operator circuit receives a first subset of bits from the n-bit multi-bit value and the shift control input receives a second subset of bits from the n-bit multi-bit value.

19. The ANN of claim 15, further comprising:
a decoder having an input and an output, the input of the decoder coupled to the shift control input of the shift operator circuit, and the output of the decoder coupled to a second input of the bit-wise operator circuit.

20. The ANN of claim 15, further comprising:
an input shift operator circuit having an input and an output, the input of the input shift operator circuit coupled to the multi-bit neuron input, and the output of the input shift operator circuit coupled to the input of the absolute value circuit.

* * * * *